Aug. 25, 1970  H. DRECHSEL ET AL  3,525,586
PRODUCTION OF SULFUR TRIOXIDE AND SULFURIC ACID
Original Filed June 5, 1964  2 Sheets-Sheet 1

Inventors
HERBERT DRECHSEL,
KARL-HEINZ DÖRR,
HUGO GRIM
BY Bailey, Stephens & Huettig
ATTORNEYS

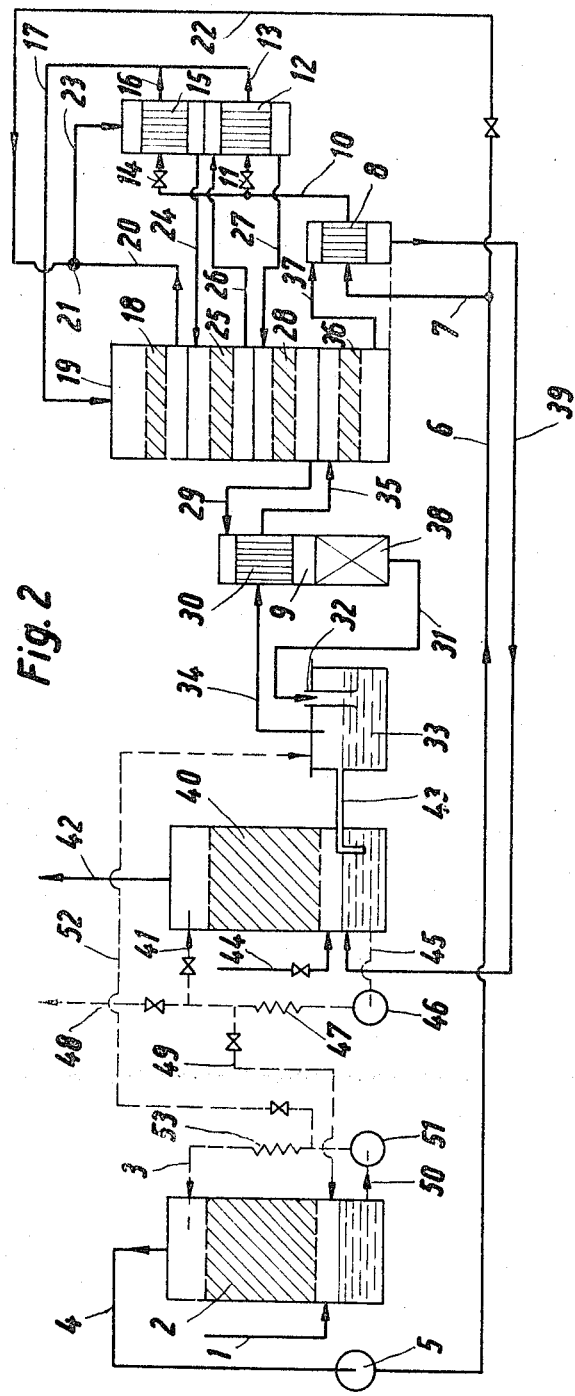

United States Patent Office 3,525,586
Patented Aug. 25, 1970

3,525,586
PRODUCTION OF SULFUR TRIOXIDE AND SULFURIC ACID
Herbert Drechsel, Karl-Heinz Dörr, and Hugo Grim, Frankfurt am Main, Germany, assignors to Metallgesellschaft Aktiengesellschaft, Frankfurt am Main, Germany
Continuation of application Ser. No. 372,836, June 5, 1964. This application Oct. 12, 1966, Ser. No. 586,302
Claims priority, application Germany, June 22, 1963, M 57,271
Int. Cl. C01b 17/76
U.S. Cl. 23—168      5 Claims

ABSTRACT OF THE DISCLOSURE

Gases having an $SO_2$ content of at least 9% are catalytically oxidized to $SO_3$ and $H_2SO_4$ in a process using a plurality of heat exchange steps and oxidation steps and a hot single stage intermediate $SO_3$ absorption step, which process is not only self-sufficient as to sensible heat requirements but provides recoverable excess heat, said process including a two step heat exchange to cool the oxidized gases supplied to the hot intermediate absorption, the first being in indirect heat exchange with the gases leaving the intermediate absorption and the second being either in indirect heat exchange with a cooling medium outside the total system to recover the excess heat or in indirect heat exchange with the cool starting $SO_2$ containing gases, in the latter instance, the excess heat recovered from the product gases from the final oxidation stage.

RELATED APPLICATION

Figure 1:
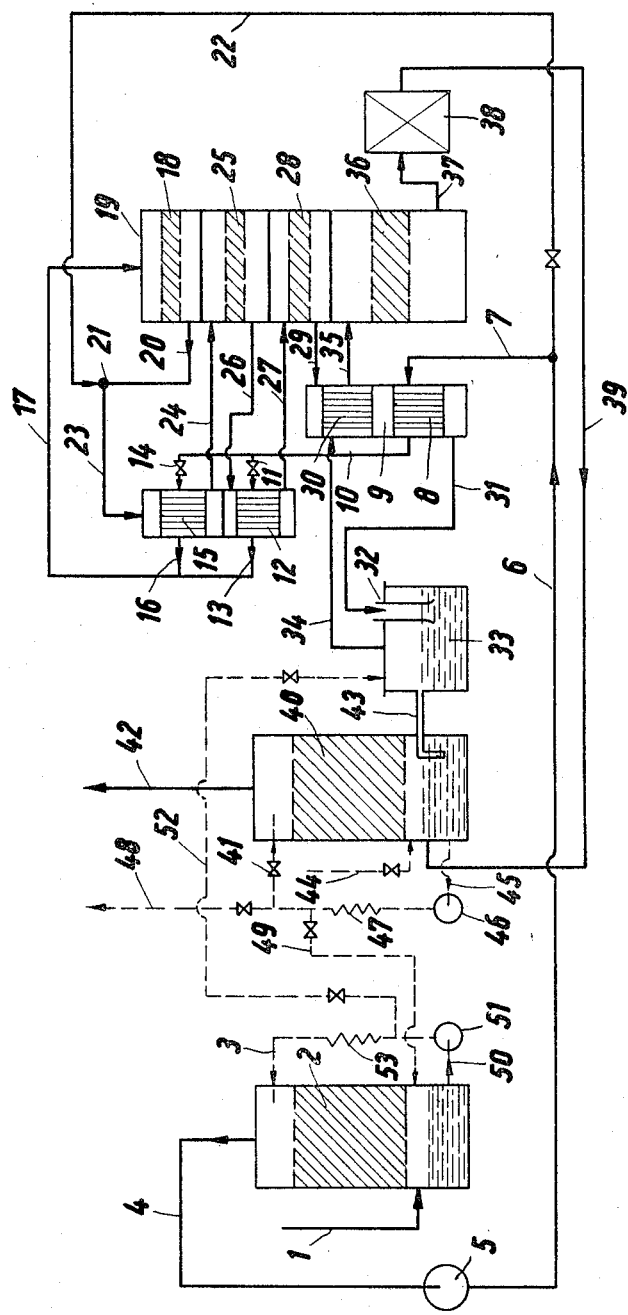

This application is a continuation of application Ser. No. 372,836, filed June 5, 1964, and now abandoned.

This invention relates to an improved process for catalytic conversion of gases containing sulfur dioxide to sulfur trioxide, sulfuric acid and mixtures thereof employing improved heat exchange and absorption conditions.

The catalytic oxidation of sulfur dioxide to sulfur trioxide should result in as high a degree of conversion as possible upon the basis of economy on the one hand and avoiding contamination of air with sulfur dioxide on the other. Moreover, the required high degree of conversion should be realized through an economically productive means.

Since the degree of conversion based on the law of mass action depends upon the ratio of oxygen to sulfur dioxide, generally the sulfur dioxide gases resulting from a roasting process are diluted with air to about 5–7% sulfur dioxide before admission to the catalyst unit. A catalysis using lower concentrations of sulfur dioxide or gases which have lower sulfur dioxide content has been suggested, but the cost of the apparatus for known processes is too high to operate the processes in an efficient manner.

About a 96 to 98.5% conversion occurs with known processes which are carried out in a catalyst with one-step absorption of the sulfur trioxide formed. The remaining sulfur dioxide is generally exhausted to the atmosphere.

It has already been suggested, in order to achieve a higher degree of conversion, that the absorption of the sulfur trioxide formed by catalysis not be carried out in one step, but in more than one step. The intermediate absorption of sulfur trioxide after the initial catalyst stages hinders the establishment of equilibrium according to the law of mass action and influences the reaction in the second catalyst stage toward a favorable conversion of sulfur dioxide.

Accordingly, an intermediate absorption process has been suggested wherein roasted gases containing 6 to 7%, and as high as 9%, sulfur dioxide are employed as the starting gases. This process is not used in practice because the apparatus employed is too costly and the technical difficulties encountered in achieving the required heat balance cannot be overcome. The provision of heat balance in the catalyst system is not adequate in treating purified sulfur dioxide gases which accordingly have a starting temperature below 100° C. without compensation for the heat loss from the intermediate absorption through addition of heat from a supplemental source.

A process disclosed in another application of the inventors comprises a process which overcomes the disadvantages of the two-step absorption of gases when employing starting gases containing about 3 to 9% sulfur dioxide. According to this process, the intermediate absorption is carried out at relatively high temperatures in the range of about 170° to 250° C., preferably at about 200° C. Also, the gas issuing from the initial catalyst stages before entrance into the intermediate absorber is cooled in an initial intermediate heat exchanger by heat exchange with the gases freed of sulfur trioxide in the intermediate absorption and cooled to about the temperature range of the intermediate absorption in a second intermediate heat exchanger by heat exchange with the cool starting gases. The heat exchange is controlled thereby in such a manner that the amount of heat withdrawn from the precatalyst gases is sufficient to bring the gases issuing from the intermediate absorption to the initiating temperature of the next catalyst stage and to cool the precatalyzed gases in the second heat exchanger to the desired operating temperature of the intermediate absorber. This two-step intermediate cooling prior to the intermediate absorption makes it possible to maintain a high temperature differential between the precatalyzed gases to be cooled and the gases from the intermediate absorption or the starting gases to be heated whereby heat exchange surfaces can be held within small economic limits. Moreover, a self-sufficient heat system is formed for the two-step absorption in treating gases having low sulfur dioxide content.

This process also enables starting with gases having significantly variable and lower sulfur dioxide content and with the minimum required heat exchange surface, that is, that required for the highest sulfur dioxide content anticipated. If the sulfur dioxide content of the starting gas falls below this value, the heat difference caused thereby is compensated for predominantly by the heat of combustion of elemental sulfur and additionally to a lesser extent by the heat of oxidation of the amount of sulfur dioxide resulting from the combustion of elemental sulfur.

An intermediate absorption process is also known which uses hot roasted gases at 400° C. containing 10 to 12% sulfur dioxide as the starting gas for the catalysis. The heat balance of the catalyst system can certainly be achieved in this process with the high starting temperature of the roasted gases. However, the roasted gases at this high temperature cannot be freed of dust and above all cannot be freed of arsenic and sulfuric acid mist. Thus choking and eventual poisoning of the catalyst is unavoidable. Moreover, an arsenic containing sulfuric acid results which is not usable for many purposes.

There are also intermediate absorption processes which operate according to a system of wet catalysis, that is, the catalysis does not start with purified and dried roasted gases, but from roasted gases which either already contain water or to which water is added in various ways. These wet catalysis processes, however, have the disadvantage that the sulfur trioxide formed is very difficult to absorb from the wet gases and therefore the sulfur trioxide vapor escapes. The sulfur trioxide can be only incompletely removed through expenditure for additional apparatus.

Also, research to keep the preliminary conversion, before the intermediate absorption, 20 to 40% low in sulfur trioxide and to absorb the sulfur trioxide formed with more dilute sulfuric acid of up to 93% and to remove the vapor carried along by cooling the gases and passing them into a coke filter yielded no vapor free gas and raised the investment costs. Other disadvantages of this are the low total conversion and the partial yield of 93% sulfuric acid.

Another wet catalytic process is carried out with addition of steam before or after the first catalyst stage in such quantities that through cooling a 96% sulfuric acid results according to the sulfur trioxide content of the converted product. Vapor formation would be largely avoided by extended cooling of the catalyst gases in a heat exchanger. The main disadvantage of this process resides in the heat exchange surfaces which are required to be large and accordingly very expensive and in the corrosion problems resulting from condensation on these surfaces.

In a different known process, the intermediate absorption is carried out with more dilute sulfuric acid, for example, 20% sulfuric acid, at distillation temperatures. Thereby the water is vaporized and the acid is concentrated. The disadvantages of this process are the non-continuous manner of operation, since the absorber acid must be replaced with dilute acid at a specific degree of concentration; the incomplete absorption of sulfur trioxide by the dilute acid, which can be improved only at higher acid concentrations; the variations in sulfur dioxide admitted to the later catalyst stages connected therewith; as well as the problem of removal of the vapor evolved.

There is also a process known for the intermediate absorption of purified and dried roasted pyrite gases or sulfur dioxide containing gases of various origins containing 9 to 12% sulfur dioxide. At this concentration of sulfur dioxide supplemental addition of heat is not necessary and a degree of conversion of over 99.5% results. This process is operated in such a manner that the cooled and purified starting gases are heated to the conversion initiating temperature of the first catalyst stage by heat exchange with the catalyzed gases issuing from the final and initial two catalyst stages, and then passed into the first catalyst stage. A cooling of the catalyst gases occurs between the initial catalyst stages and the later catalyst stages by injecting cold gas. The precatalyzed gases from the initial catalyst stages are cooled to the initiating temperature of the next catalyst stage by heat exchange with the roasted gases and carried from this catalyst stage having a rate of conversion of 80 to 95% into a heat exchanger where it is cooled by the gases from the intermediate absorption to 175 to 215° C. Thereupon the intermediate absorption of the sulfur trioxide formed is carried out with stronger absorbing acid. The resulting gases are heated by heat exchange with the hot precatalyzed gases of the second catalyst stage to the initiating temperature of the third catalyst stage and the final conversion carried out in this third stage. Thereupon, the absorption of residual sulfur trioxide takes place in a final absorber.

This process produces a closed self-sufficient heat system. However, in viewing the total heat balance, besides the unavoidable loss of heat by radiation, a heat loss occurs in the intermediate absorption. The total amount of the preconverted gas issued from the second catalyst stage is cooled to about 70° C. in the intermediate absorber and the amount of heat carried off thereby goes into the acid recycle and is accordingly lost, even though the heat content and therewith the temperature of the final catalyzed gases leaving the final heat exchanger, which equals the sum of the hot content of the cooled starting gases, the heat of reaction, the heat content of the gases from the intermediate absorption less the sum of the loss from radiation and the amount of heat carried off in the intermediate absorption, is adequate to heat the starting gases to the initiating temperature of the first catalyst stage. Also, a considerable amount of heat is carried off in the acid recycle in using an intermediate absorption which is carried out as a hot intermediate absorption, and is thus lost for use in the catalyst system.

It is also known to divide the intermediate absorption so that a part of the sulfur trioxide is absorbed with the help of oleum and the remainder with sulfuric acid. Here also an amount of heat is lost corresponding to the temperature difference of the gases between exit from the second catalyst stage and exit from the monohydrate intermediate absorption.

An object of the present invention is to provide a process for production of sulfur trioxide and sulfuric acid which employs a hot intermediate absorption and self sufficient heat system. Another object is to provide such a process which not only has a self sufficient heat system but from which significant amounts of heat may be recovered for other purposes, as, for example, steam generation or heating feed water.

The process according to the invention is employed for treating gases containing about 9% sulfur dioxide up to the higher limits permissible in such a catalysis.

The process according to the invention in general comprises catalytically converting the sulfur dioxide containing starting gas to sulfur trioxide, carrying out the intermediate absorption in a dip absorber and employing heat exchange in a two stage heat exchanger following the initial catalyst stages. The first stage of the intermediate heat exchanger is arranged in such a manner that the gases freed of sulfur trioxide issued from the intermediate absorption at the operating temperature of the absorption of about 170° to 250° C., preferably about 200° C., are heated to the initiating temperature of about 400° C. of the final catalyst stage of heat exchange with the precatalyzed gases, which are at 500° C. Also, the precatalyzed gases issued from the first heat exchange stage are cooled to a temperature in a second heat exchange step, by heat exchange with the purified cool starting gases, which is such that the heat content of the gas entering the intermediate absorption and the part of the heat taken up in the intermediate absorption is sufficient to bring the gases issued from the intermediate absorption to about the temperature at which the intermediate absorption is operated.

This feature of intermediate heat exchangers of the invention in comparison with other known processes not only eliminates the heretofore unavoidable heat loss in the intermediate absorption but also a part of the absorption heat of the intermediate absorption is recovered for use in the total heat balance of the catalyst system. This enables the profitable use of the heat content of catalyzed gases from the final catalyst stage for other purposes, such as making the production of the self sufficiency of the catalyst system more efficient, since the amounts of heat present according to the heat exchange system of the invention are sufficient to cover the balance of heat needed to heat the starting gas to the initiating temperature of the first catalyst stage. The utilization of the heat content of the final catalyzed gases can be effected in customary ways. For example, it can be employed for preheating feed water or for production of steam at reduced pressure.

Another embodiment of the process of the invention comprises the use of the balance of excess heat of the precatalyzed gases issued from initial catalyst stages in the second stage of the intermediate heat exchanger for other purposes and the use of the heat content of the final catalyzed gases for heating the cool starting gases. This feature of the invention is especially advantageous if the sulfur dioxide content of the starting gas fluctuates or is variable, because the operation of the second stage of the intermediate heat exchanger as an economizer, for example, makes it possible to regulate the temperature of the gases within wide limits without changing the heat exchange surfaces.

The process of the invention enables an increase of production of steam of about 25% in the roasting of pyrites in a fluid bed furnace with subsequent catalysis, for example, by the passage of feed water either through the final heat exchanger or the second stage of the intermediate heat exchanger where it is preheated with the heat which is in excess of that required for the heat balance of the catalyst system, these heat exchangers being thus used as economizers.

Another feature of the process of the invention is that the intermediate exchange absorber is arranged in such a manner that the absorbing acid freely overflows into the final absorber at a certain level and that the removal of gas, that is, sulfur dioxide, from all of the exchange acid takes place in the intermediate absorber. The sulfur dioxide released by this removal of gas is passed into the final catalyst stage and converted to sulfur trioxide. In order to provide the required acid concentration, necessary amounts of diluting water can be added to the acid recycle, preferably to the acid recycle of the final absorber.

The essential advantage of this feature of the invention is that since the acid which runs from the intermediate absorber into the final absorber has had the gas extracted from it therefore the final gas issuing from the final absorber is practically free of sulfur dioxide and accordingly the escape of sulfur dioxide to and contamination of the air is avoided.

A further advantage of the invention is that in comparison with known processes a smaller amount of cooling water is employed in cooling the acid recycle.

The process according to the invention is herein described with reference to the accompanying drawings which illustrate the embodiments of the invention.

FIG. 1 is a schematic illustration of the process of the invention described hereinafter with particular reference to Example 1; and FIG. 2 is also a schematic illustration of the process of the invention described hereinafter with particular reference to Example 2.

Similar numbers in each of the figures indicate corresponding parts in the drawings.

The invention is described in the following examples to further illustrate the process.

EXAMPLE 1

A roasted gas containing 9.5% by volume sulfur dioxide was cooled and purified in a known manner, the gas being cooled to 45° C. 10,000 normal cubic meters per hour of starting gas were passed through line 1 into the drying tower 2, sprayed with 56 cubic meters per hour of 96% drying acid admitted through line 3 at 50° C. and passed at a temperature of 60° C. through line 4 and pump 5 into line 6. 9000 normal cubic meters per hours of the starting gas were passed into the second stage 8 of the intermediate heat exchanger 9, which had 48% of the total heat exchange surface necessary for the control of the temperature ratio within the catalyst system. There the gas was preheated to 240° C. and removed through line 10. A partial stream of 4200 normal cubic meters per hour of starting gas passed through line 11 into the heat exchanger 12, which had 11% of the total heat exchange surface. In heat exchanger 11 it was heated to 450° C. and removed through line 13. Another partial stream of 4800 normal cubic meters per hour passed through line 14 into heat exchanger 15, which had 11% of the total heat exchange surface, was likewise heated to 450° C., removed through line 16, combined in line 17 with the gases from line 13 and carried into the first catalyst stage 18 of the catalyst unit 19. The precatalyzed gases passed from the catalyst stage 18 through line 20 at a temperature of 630° C. were passed into the mixing chamber 21 with 1000 normal cubic meters per hour of starting gas which was introduced through line 22. The mixture cooled to 580° C. was passed through line 23 into heat exchanger 15. There the precatalyzed gases were cooled to about 480° C. by heat exchange with the preheated starting gases admitted through line 14 and carried through line 24 into the second catalyst stage 25. The catalyzed gas from catalyst stage 25 was passed at a temperature of 550° C. through line 26 into the heat exchanger 12 where it is cooled to 460° C. by a heat exchange with the preheated starting gases admitted through line 11 and carried through line 27 into the third catalyst stage 28. The precatalyzed gas from the catalyst stage 28 was passed through line 29 into the first stage 30 of the intermediate heat exchanger 9, cooled to 320° C., passed into the second stage 8, there cooled to 130° C. by heat exchange with the starting gas admitted through line 7 and carried through line 31 and tube 32 into the intermediate absorber 33. The precatalyzed gas freed of sulfur trioxide at a rate of 820 normal cubic meters per hour was passed through line 34 into the first stage 30 of the intermediate heat exchanger 9, which has 30% of the total heat exchange surface, where it is heated to 400° C. by heat exchange with the precatalyzed gases from catalyst stage 28 introduced through line 29. The gas from the intermediate absorber was then passed through line 35 into final catalyst stage 36. 8680 normal cubic meters per hour of the final catalyzed gases were carried through line 37 into the economizer 38, cooled to 130° C. and passed through line 39 into the final absorber 40. In the final absorber it was treated with 90 cubic meters per hour of absorbing acid at 70° C., which was introduced through line 41. The final gas was exhausted to the atmosphere through line 42. The absorbing acid of the intermediate absorber 33 flowed through the overflow tube 43 at a temperature of 200° C. into the final absorber 40. The acid of the final absorber was maintained at 98.5% by weight by addition of water through line 44. The acid was carried off through line 45 and pump 46 and cooled in cooler 47 to 70° C. The product was passed to another production stage not shown through line 48 and the exchange acid carried through line 49 into the dryer 2. The drying acid was taken out of the dryer through line 50 and pump 51. A partial stream of the acid was passed into the intermediate absorber 33 to exchange acid through line 52 and a partial stream was passed back into the drier as spraying acid through cooler 53 and line 3.

EXAMPLE 2

A roasted gas containing 9.5% by volume sulfur dioxide was cooled and purified in a known manner. The cooled roasted gas had a temperature of 45° C. 10,000 normal cubic meters per hour of starting gas was carried through line 1 into drying tower 2, sprayed with 56 cubic meters per hour of 96% drying acid at 50° C. admitted through line 3 and passed at a temperature of 60° C. through line 4, pump 5 and line 6. 9000 normal cubic meters per hour were passed through line 7 into heat exchanger 8, which had 31% of the total heat exchange surface, there preheated to 240° C. and passed out through line 10. A partial stream of 4200 normal cubic meters per hour passed through line 11 into heat exchanger 12, which had 14.5% of the total heat exchange surface, was there heated to 450° C. and carried out through line 13. Another partial stream of 5300 normal cubic meters per hour was passed through line 14 into heat exchanger 15, which had 14.5% of the total heat exchange surface, was likewise heated to 340° C., carried out through line 16 and mixed in line 17 with the gases from line 13. The mixture was passed into the first catalyst stage 18 of the catalyst unit 19. The precatalyzed gases left the catalyst stage 18 through line 20 at a temperature of 630° C., were cooled to 580° C. in the mixing chamber 21 by mixture with 1000 normal cubic meters per hour of the starting gas, which was introduced through line 22. This mixture was then passed through line 23 into heat exchanger 15. There the precatalyzed gas was cooled to 480° C. by heat exchange with the preheated starting gases introduced through line 14, and carried through line 24 into the second catalyst stage. From this catalyst stage the catalyzed gas at a temperature of 550° C. was passed through line 26 into heat exchanger 12, there cooled to 460° C. by heat exchange with the preheated starting gas introduced through line 11 and carried into the third catalyst stage 28 through line 27. The precatalyzed gas was passed from catalyst stage 28 through line 29 into the first stage 30 of intermediate heat exchanger 9, cooled to 320° C. and carried into the second stage 38. This second stage 38 functions as an economizer wherein the gas is cooled to 130° C. by heat exchange with feed water and carried through line 31 into the intermediate absorber 33 through tube 32 which was immersed in the absorbing acid. 8720 normal cubic meters per hour of precatalyzed gas freed of sulfur trioxide passed through line 34 into the first stage 30 of intermediate heat exchanger 9, which had 40% of the total heat exchange surface, where the gas was heated to 400° C. by heat exchange with the precatalyzed gases introduced through line 29. The gas from the intermediate absorber was then passed through line 35 into the final catalyst stage 36. 8680 normal cubic meters of the final catalyzed gas were carried through line 37 into the heat exchanger 8 and there by exchange of heat with the gases admitted through line 7 cooled to 230° C., passed through line 39 into the final absorber 40, there treated with 90 cubic meters per hour of absorption acid at 70° C., which was admitted through line 41, and exhausted to the atmosphere through line 42. The absorber acid of the intermediate absorber 33 flowed through the overflow tube 43 at a temperature of 200° C. into the final absorber 40. The acid of the final absorber was standardized to 98.5% by weight by water addition through line 44, carried off through line 45 and pump 46 and cooled in cooler 47 to 70° C. Part of the acid for use in other production processes not shown was taken off through line 48 and the exchange acid carried through line 49 into dryer 2. The drying acid was cycled from dryer 2 through line 50 and pump 51. After pump 51 a partial stream of acid was passed through line 52 into the intermediate absorber 33 as exchange acid and part back through cooler 53 into the dryer 2 as spraying or scrubbing acid.

We claim:
1. In a process for catalytic conversion of gases containing at least about 9 volume percent of $SO_2$ to an oxidation product selected from the group consisting of $SO_3$, sulfuric acid and mixtures thereof, wherein $SO_2$ containing cool starting gases are purified, dried and then preheated by indirect heat exchange with hot $SO_3$ containing gases before conversion; wherein the resulting preheated $SO_2$ containing gases are catalytically oxidized in initial and final oxidation stages, the initial oxidation stage consisting of a plurality of oxidation steps; wherein $SO_3$ formed in the initial oxidation stage is absorbed in a hot intermediate absorption; wherein the $SO_3$ formed in the initial oxidation stage is cooled before entrance into the hot intermediate absorption in an intermediate heat exchange step by indirect heat exchange with gases from the hot intermediate absorption; and wherein $SO_3$ formed in the final oxidation stage is absorbed in a final absorption to produce sulfuric acid, the improvement comprising in combination carrying out the intermediate absorption in a single stage hot absorption with an operating temperature of about 170 to 250° C., cooling the gases resulting from the last step of the initial oxidation stage before admission into the intermediate absorption by a two step intermediate heat exchange, wherein, in the first step of the intermediate heat exchange, oxidation product free gases issued from the intermediate absorption are the medium heated and are heated to a temperature sufficient to initiate catalytic oxidation in the final oxidation stage and, in the second step of which, the gases resulting from the initial oxidation stage are further cooled to a temperature below the operating temperature of the intermediate absorption such that the heat absorbed by them in the intermediate absorption step increases their temperature to the operating temperature of the intermediate absorption; and heating water from outside the total system with the heat, from at least one of the final and initial catalyst stages, which is in excess of the total system created by a combination of the oxidation and absorption stages to recover said excess heat in usable form, the heat in the process being only supplied by heat of catalytic oxidation of the $SO_2$ contained in the starting gases and by heat exchange of materials in the system.

2. A process as in claim 1 wherein the operating temperature of the intermediate absorption is about 200° C.

3. In a process for catalytic conversion of gases containing at least about 9 volume percent of $SO_2$ to an oxidation product selected from the group consisting of $SO_3$, sulfuric acid and mixtures thereof, wherein $SO_2$ containing cool starting gases are purified, dried and then preheated by indirect heat exchange with hot $SO_3$ containing gases before conversion; wherein the resulting preheated $SO_2$ containing gases are catalytically oxidized in initial and final oxidation stages, the initial oxidation stage consisting of a plurality of oxidation steps; wherein $SO_3$ formed in the initial oxidation stage is absorbed in a hot intermediate absorption; wherein the $SO_3$ formed in the initial oxidation stage is cooled before entrance into the hot intermediate absorption in an intermediate heat exchange step by indirect heat exchange with gases from the hot intermediate absorption; and wherein $SO_3$ formed in the final oxidation stage is absorbed in a final absorption to produce sulfuric acid, the improvement comprising in combination:
(a) successively cooling the product gas from the last step of the initial oxidation stage to a temperature below the operating temperature of the intermediate absorption, before admisison to the intermediate absorption, which is a one stage absorption in which the absorbing acid overflows at a predetermined level into the final absorption, said intermediate absorption operating at a temperature of about 170–250° C., by
 (1) indirect heat exchange with gas issued from the intermediate absorption, and
 (2) indirect heat exchange with a cooling medium A,
said successive cooling in steps (1) and (2) being to such a temperature that the heat absorbed by the cooled product gas in the intermediate absorption step increases it to the operating temperature of the intermediate absorption, and
(b) cooling the product gases from the final oxidation stage by indirect heat exchange with a cooling medium B, the heat required in the process being supplied only by heat of catalytic oxidation of the $SO_2$ contained in the starting gases and heat exchange of materials within the system, one of cooling mediums A and B being part of the $SO_2$ containing cool starting gases and the other being water from outside of the total system to recover usable heat in said water.

4. In a process for catalytic conversion of gases containing at least about 9 volume percent of $SO_2$ to an oxidation product selected from the group consisting of $SO_3$, sulfuric acid and mixtures thereof, wherein $SO_2$ containing cool starting gases are purified, dried and then preheated by indirect heat exchange with hot $SO_3$ containing gases before conversion, wherein the resulting preheated $SO_2$ containing gases are catalytically oxidized in initial and final oxidation stages, the initial oxidation stage consisting of a plurality of oxidation steps; wherein $SO_3$ formed in the initial oxidation stage is absorbed in a hot intermediate absorption; wherein the $SO_3$ formed in the initial oxidation stage is cooled before entrance into the hot intermediate absorption in an intermediate heat exchange step by indirect heat exchange with gases from the hot intermediate absorption; and wherein $SO_3$ formed in the final oxidation stage is absorbed in a final absorption to produce sulfuric acid, the improvement comprising in combination:

(a) successively cooling the product gas from the last step of the initial oxidation stage to a temperature below the operating temperature of the intermediate absorption, before admission to the intermediate absorption, which is a one stage absorption in which absorbing acid overflows at a predetermined level into the final absorption, said intermediate absorption operating at a temperature of about 170–250° C., by
  (1) indirect heat exchange with gas issued from the immediate absorption, and
  (2) indirect heat exchange with part of the $SO_2$ containing cool starting gases,
said successive cooling in steps (1) and (2) being to such a temperature that the heat absorbed by the cooled product gas in the intermediate absorption step increases it to the operating temperature of the intermediate absorption, and (b) cooling the product gases from the final oxidation stage by indirect heat exchange with water from outside the total system to recover useable heat in said water, the heat required in the process being supplied only by heat of catalytic oxidation of the $SO_2$ contained in the starting gases and heat exchange of materials within the system.

5. In a process for catalytic conversion of gases containing at least about 9 volume percent of $SO_2$ to an oxidation product selected from the group consisting of $SO_3$, sulfuric acid and mixtures thereof, wherein $SO_2$ containing cool starting gases are purified, dried and then preheated by indirect heat exchange with hot $SO_3$ containing gases before conversion; wherein the resulting preheated $SO_2$ containing gases are catalytically oxidized in initial and final oxidation stages, the initial oxidation stage consisting of a plurality of oxidation steps; wherein $SO_3$ formed in the initial oxidation stage is absorbed in a hot intermediate absorption; wherein the $SO_3$ formed in the initial oxidation stage is cooled before entrance into the hot intermediate absorption in an intermediate heat exchange step by indirect heat exchange with gases from the hot intermediate absorption; and wherein $SO_3$ formed in the final oxidation stage is absorbed in a final absorption to produce sulfuric acid, the improvement comprising in combination:

(a) successively cooling the product gas from the last step of the initial oxidation stage to a temperature below the operating temperature of the intermediate absorption, which is a one stage absorption in which absorbing acid overflows at a predetermined level in to the final absorption, said intermediate absorption operating at a temperature of about 170–250° C., by
  (1) indirect heat exchange with gas issued from the intermediate absorption and
  (2) indirect heat exchange with water from outside the total system to recover usable heat in said water.
said successive cooling in steps (1) and (2) being to such a temperature that the heat absorbed by the cooled product gas in the intermediate absorption step increases it to the operating temperature of the intermediate absorption, and (b) cooling the product gases from the final oxidation stage by indirect heat exchange with part of the $SO_2$ containing cool starting gases, the heat required in the process being supplied only by heat of catalytic oxidation of the $SO_2$ contained in the starting gases and heat exchange of materials within the system.

References Cited
UNITED STATES PATENTS

| | | | |
|---|---|---|---|
| 3,142,536 | 7/1964 | Guth et al. | 23—175 |
| 3,259,459 | 7/1966 | Moller | 23—176 |
| 2,028,416 | 1/1936 | Silsby | 23—175 |
| 2,364,213 | 12/1944 | Herrmann | 23—175 |
| 3,404,955 | 10/1968 | Drechsel et al. | 23—168 |

OSCAR R. VERTIZ, Primary Examiner

G. T. OZAKI, Assistant Examiner

U.S. Cl. X.R.

23—176